W. M. BARNES.
AUTOMATIC BRAKE FOR VEHICLES.
APPLICATION FILED JAN. 16, 1917.

1,244,942.

Patented Oct. 30, 1917.

Inventor
Wm. M. Barnes
By Franklin N. Hough
Attorney

Witness
Wm. F. Doyle
A. R. Fowler

UNITED STATES PATENT OFFICE.

WILLIAM M. BARNES, OF CIRCLEVILLE, OHIO.

AUTOMATIC BRAKE FOR VEHICLES.

1,244,942.　　　　　　Specification of Letters Patent.　　Patented Oct. 30, 1917.

Application filed January 16, 1917. Serial No. 142,713.

*To all whom it may concern:*

Be it known that I, WILLIAM M. BARNES, a citizen of the United States, residing at Circleville, in the county of Pickaway and State of Ohio, have invented certain new and useful Improvements in Automatic Brakes for Vehicles; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in automatic brakes for vehicles and consists of a simple and efficient device of this nature having various details of construction, combinations and arrangements of parts which will be hereinafter fully described, shown in the accompanying drawings and then specifically defined in the appended claims.

I illustrate my invention in the accompanying drawings, in which:—

Figure 1:
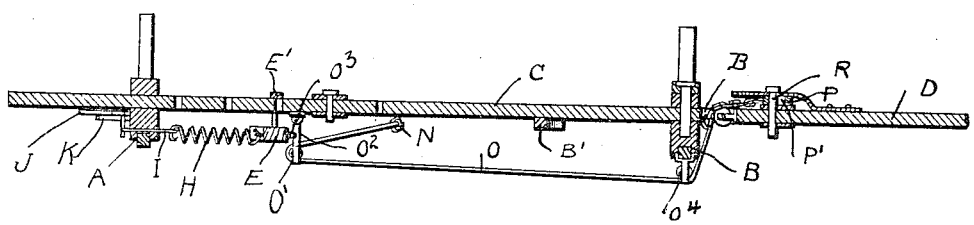
Figure 1 is a central vertical sectional view through a wagon equipped with my improved brake mechanism, parts being shown in elevation.
Figure 2:
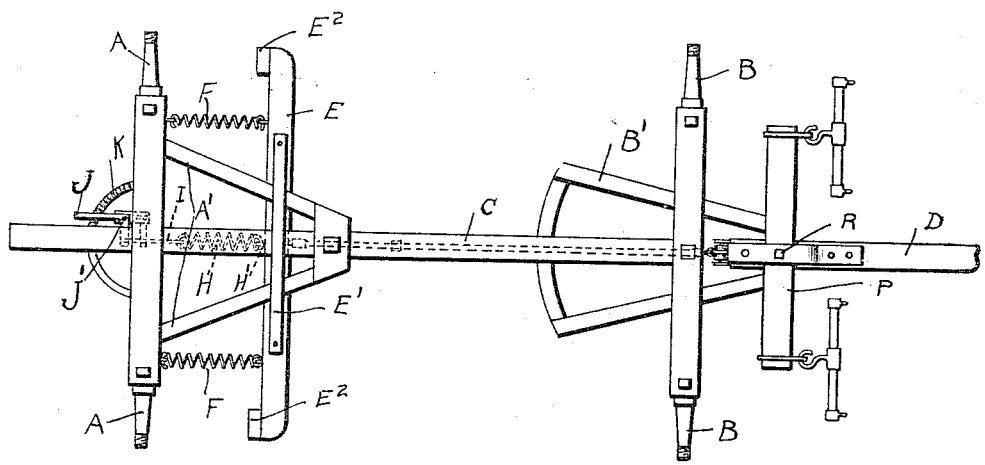
Fig. 2 is a top plan view.
Figure 3:
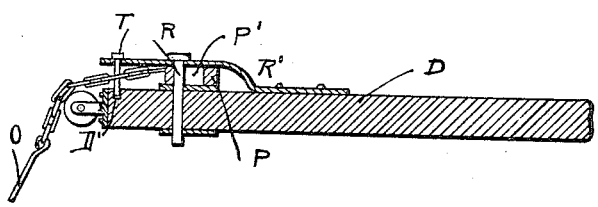
Fig. 3 is an enlarged vertical sectional view through the tongue of a vehicle showing parts in elevation.

Reference now being had to the details of the drawings by letter, A designates the rear axle of the running gear of a vehicle and B the forward axle and C is a reach connecting the axles, and D a tongue connected to the forward hounds B'. A brake beam E, of the usual construction, is mounted upon the reach and supported by the bar E and carries at each end a brake shoe $E^2$, said supporting bar E' resting upon the hound A'. Coiled springs F are connected at their rear ends to the brake beam A and at their forward ends to the beams E, the tension of said springs being sufficient to normally apply the brake shoe to the rear wheels while the vehicle, unloaded, is going down a moderate grade. A coiled spring H is fastened at H' to the brake beam E and has a rod I fastened to its rear end which in turn is pivotally connected to one end of the angle lever J, which latter is pivoted at J' to the rear axle, the long arm of the lever serving as a handle. A curved rack bar K is fastened to the rear axle in a horizontal plane and the teeth thereof are adapted to be engaged by said lever to hold the same in different positions to regulate the tension of the spring H, so that pressure may be applied to the wheels to conform to the load of the vehicle.

Secured to the reach at N is a cable O including a link section which passes about a pulley O', pivotally mounted in the lower end of the hanger $O^2$. Said brake bar E has a loose pivotal connection through the medium of the pin $O^3$ with the hanger $O^2$. Said cable passes over a second pulley $O^4$, fastened to the forward axle and is connected to the evener P, which is slotted as at P'. A pin R upon the tongue passes through said slot and limits the movement of the evener.

The means for preventing the brake setting when a team attached to the apparatus backs consists of a headed pin T mounted in the bar R' and adapted to drop through a link of the chain O and engage a hole D' of the tongue D.

In operation, when the team connected to the whiffletree upon the evener pulls the latter a slight distance, limited by the pin coming in contact with the end of the slot P', the cable O will be pulled, causing the brake shoes to be relieved from frictional contact with the rear wheels but, when the pull upon the evener is released as would be the case in going down a grade, the springs will cause the evener to return to its farthest rearward limit and permit the springs to apply the brakes to the rear wheels, the tension of the spring H being regulated by the lever J, as will be readily understood. In the event of it being desired to back the vehicle without applying the brakes, the headed pin T may be positioned to engage within the respective links of the cable O, thus holding the brake shoes from contact with the wheels.

What I claim to be new is:—

1. An automatic brake for vehicles, comprising axles and a reach connecting the same, a brake bar and means for supporting the same, shoes upon the brake bar, springs connecting the rear axle and said bar, a second spring connected at one end to the brake bar, means for adjusting the tension of said second referred to spring, a pivotal hanger connected to the brake bar, a pulley upon said hanger, and an evener and cable connecting the same with said hanger.

2. An automatic brake for vehicles comprising axles and a reach connecting the same, a brake bar and means for supporting the same, shoes upon the brake bar, springs connecting the rear axle and said bar, a second spring connected at one end to the brake bar, an angle lever pivotally mounted upon the rear axle, one end of said lever being connected to said second referred to spring, a ratchet segment secured to said axle and adapted to be engaged by said lever, a hanger pivoted to the reach and having pivotal connection with said brake bar, a pulley upon the hanger, and a movable evener connected to said cable.

3. An automatic brake for vehicles comprising axles and a reach connecting the same, a brake bar and means for supporting the same, shoes upon the brake bar, springs connecting the rear axle and said bar, a second spring connected at one end to the brake bar, an angle lever pivotally mounted upon the rear axle, one end of said lever being connected to said second referred to spring, a ratchet segment secured to said axle and adapted to be engaged by said lever, a hanger pivoted to the reach and having pivotal connection with said brake bar, a pulley upon the hanger, a cable secured to the reach and passing over said pulley, a chain secured to the cable, a movable evener to which the chain is connected, and a headed pin carried by the front hound and adapted to engage within the respective links.

4. An automatic brake for vehicles comprising axles and a reach connecting the same, a brake bar and means for supporting the same, shoes upon the brake bar, springs connecting the rear axle and said bar, a second spring connected at one end to the brake bar, an angle lever pivotally mounted upon the rear axle, one end of said lever being connected to said second referred to spring, a ratchet segment secured to said axle and adapted to be engaged by said lever, a hanger pivoted to the reach and having pivotal connection with said brake bar, a pulley upon the hanger, a movable evener, a tongue upon which the latter is mounted, a chain connected to said evener, a cable connected to the chain, passing about said pulleys and secured to the reach, a bar secured to said tongue, a pin carried in an aperture in said bar and engaging a link in said chain and also a hole in the tongue.

In testimony whereof I hereunto affix my signature in presence of two witnesses.

WILLIAM M. BARNES.

Witnesses:
C. A. LEIST,
A. R. BARNES.

Copies of this patent may be obtained for five cents each, by addressing the "Commissioner of Patents, Washington, D. C."